United States Patent
Schütte et al.

(10) Patent No.: US 6,277,333 B1
(45) Date of Patent: *Aug. 21, 2001

(54) PROCESS FOR REDUCING OR AVOIDING FOAM PRODUCTION DURING CHEMICAL AND PHYSICAL MATERIALS CONVERSION PROCESSES AND A DEVICE FOR PERFORMING THIS PROCESS

(75) Inventors: Rüdiger Schütte, Frankfurt; Alexander Ruhs, Rheinfelden, both of (DE); Ivan Pelgrims, Kontich (BE)

(73) Assignee: Degussa AG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,240

(22) Filed: Dec. 5, 1997

(30) Foreign Application Priority Data

Dec. 7, 1996 (DE) ............................................. 196 50 959

(51) Int. Cl.⁷ ............................. B01D 19/02; B01D 9/02; B01J 8/22
(52) U.S. Cl. ....................... 422/129; 422/133; 422/245.1; 96/176
(58) Field of Search .................................. 422/133, 140, 422/189, 129, 245.1; 96/176, 179; 261/DIG. 26, 76

(56) References Cited

U.S. PATENT DOCUMENTS

| | | | |
|---|---|---|---|
| 4,111,829 | * | 9/1978 | Bimond et al. ...................... 96/176 |
| 5,480,617 | * | 1/1996 | Uhlemann et al. ................. 422/140 |

FOREIGN PATENT DOCUMENTS

| | | |
|---|---|---|
| 2634277 | 2/1977 | (DE) . |
| 2539797 | 3/1977 | (DE) . |
| 3900170A1 | 7/1990 | (DE) . |
| 0452164 | 10/1991 | (EP) . |
| 0455243 | 11/1991 | (EP) . |
| 97/38081 | 10/1997 | (WO) . |

OTHER PUBLICATIONS

Patent Abstracts of Japan vol. 10, No. 112, Apr. 25, 1986, JP 60 241902A, Nov. 30, 1985.

* cited by examiner

Primary Examiner—Hien Tran
(74) Attorney, Agent, or Firm—Smith, Gambrell & Russell, LLP

(57) ABSTRACT

The production of foam which occurs in many chemical and physical materials conversion processes can be avoided by performing the materials conversion process in an ascending jet reactor, including a baffle-free container with a tapering lower section, preferably a conical lower section, and a device for gas injection, and the contents of the reactor are thoroughly mixed by means of ascending jet circulation caused by gas injection.

5 Claims, 1 Drawing Sheet

PROCESS FOR REDUCING OR AVOIDING FOAM PRODUCTION DURING CHEMICAL AND PHYSICAL MATERIALS CONVERSION PROCESSES AND A DEVICE FOR PERFORMING THIS PROCESS

INTRODUCTION AND BACKGROUND

The present invention relates to a process for reducing or avoiding foam production during chemical and physical materials conversion processes in a liquid medium, wherein the materials conversion is performed in a hopper-shaped reactor with thorough mixing of the contents of the reactor. The invention also relates to a device for performing the process.

In many chemical and physical materials conversion processes more or less intensive foam production occurs which makes process control difficult or even impossible. Thus specific measures are required in order to break down the foam and/or to avoid the production of foam or at least to reduce it to an acceptable level. Although foam production can sometimes be avoided or reduced by managing the flow conditions in the reactors, for instance by avoiding sharp bends in the flow and locating liquid inlets below the surface of the liquid, in many cases these types of action are not enough. Accordingly, processes for breaking down the foam, including thermal, chemical and mechanical processes, have to be used. A review of this topic is provided by Pahl et al., Chem.-Ing.-Tech. 67 (1995), 300–312. The process engineering involved becomes more complicated when using known measures for breaking down foams and/or the product purity of the product being produced is reduced by the use of chemical antifoam agents. In addition, the production costs are increased.

A variety of reactors have been disclosed for performing batchwise and continuous crystallization processes in which foam problems often occur due to intensive internal or external circulation of the liquid reaction medium containing the growing crystals. A review of this topic is provided in Ullmann's Encyclopedia of Industrial Chemistry, 5th ed. (1988) vol. B2, 3–22 to 3–25. For example, a crystallizer with forced external circulation includes an evaporation tank, a circulation system with pumps and heat exchanger as well as a feed pipe for the solution being supplied and a withdrawal port for the crystal suspension. Over and above the problems associated with foam production, secondary seed crystal formation occurs as a result of the mechanical circulation system and this leads to the production of a finely divided product, while there is a risk of incrustations forming in the heat exchanger.

Vacuum crystallizers with internal circulation of the crystal suspension, for example a Swenson or Standard-Messo crystallizer, contain a guide tube located in the tank or a variety of shapes of guide metal sheeting and an agitator. It has been shown that, even in these types of crystallizers, foam is often produced which then requires the use of antifoam agents or special devices for breaking down the foam. Here again, the particles are broken down due to the input of mechanical energy via the agitator and as a result of deflections on encountering the baffles. Although the proportion of fine particles is reduced by reducing the speed of rotation of the agitator, incrustations and problems due to insufficient mixing then occur. These types of problems have been observed in practice when preparing sodium perborate in accordance with the process described in CAV 1973, pages 45–50.

According to classical crystallization theory, although poor particle number control in crystallizers of the type mentioned above can be improved by chemically influencing the production of seed crystals or by the dissolution of seed crystals or by structural separation of the seed crystal production and particle growth zones, these types of measures are associated with additional expense. Although the process according to EP-B 0 452 164 makes use of these types of measures during the preparation of sodium perborate, the foam problem is not solved and, depending on the choice of surface-active substance used in this process, may even be intensified.

The hydrodynamic behavior of a suspension in a reactor with a lower section which tapers to a point, for example a cylindrical container with a conical lower section which is agitated by gas injection by means of nozzles arranged at a point source or in a line at the tip, has been studied many times; see R. H. Kleijntjens et al. in the Canadian J. of Chem. Engineering 72 (1994), 392–404 and Y. T. Shah et al. in Chem. Eng. Comm. 110 (1991), 53–70. In these types of reactors, there is an upwards directed flow in the region of the stream of bubbles and, parallel to this, a downwards directed backflow near the walls. The solids concentration is at its highest in the lower region of the conical part of the container. These above documents mentioned do not suggest using these types of ascending jet reactors to minimize foam production occurring during a materials conversion process or as a crystallization reactor for continuous crystallization. This type of use, again, is not obvious from the details given in Verfahrenstechnische Berechnungsmethoden, part 4 (1988), chapter 6, in particular pages 158–159, 167–169 and 206–209, since in that document (page 208) reference is made to the foam problem and the use of chemical antifoam agents is recommended for controlling foam.

Accordingly, an object of the invention is aimed at performing chemical and physical materials conversion processes with substances dissolved in a liquid phase and/or suspended therein, and with thorough mixing of the contents of the reactor, in such a way that it is possible to perform the process without any significant foam problems.

A further object of the invention is to achieve the above by using simple engineering means and avoiding or minimizing the addition of antifoam agents.

A still further object of the invention is to improve physical materials conversion processes, and especially a crystallization process, wherein a dissolved substance is crystallized out. Chemical materials conversion processes may be any chemical reactions, in particular those which are performed in the presence of a solid suspended in a liquid medium, for example a solid catalyst, or during which a solid is formed, for instance by reaction and subsequent crystallization or by polymerization.

SUMMARY OF THE INVENTION

The above and other objects of the invention are achieved by a process for reducing or avoiding foam production during chemical and physical materials conversion processes in a liquid medium, wherein the materials conversion is performed in a hopper-shaped reactor with thorough mixing of the contents of the reactor.

It is a feature of the invention that an ascending jet reactor which is substantially free of baffles, tapering in the lower section and provided with a device for gas injection in a position which enables ascending jet circulation, is used as a reactor and thorough mixing of the contents of the reactor is achieved by gas injection.

BRIEF DESCRIPTION OF DRAWINGS

The invention will be further understood with reference to the drawings, wherein.

DETAILED DESCRIPTION OF INVENTION

Figure 1:
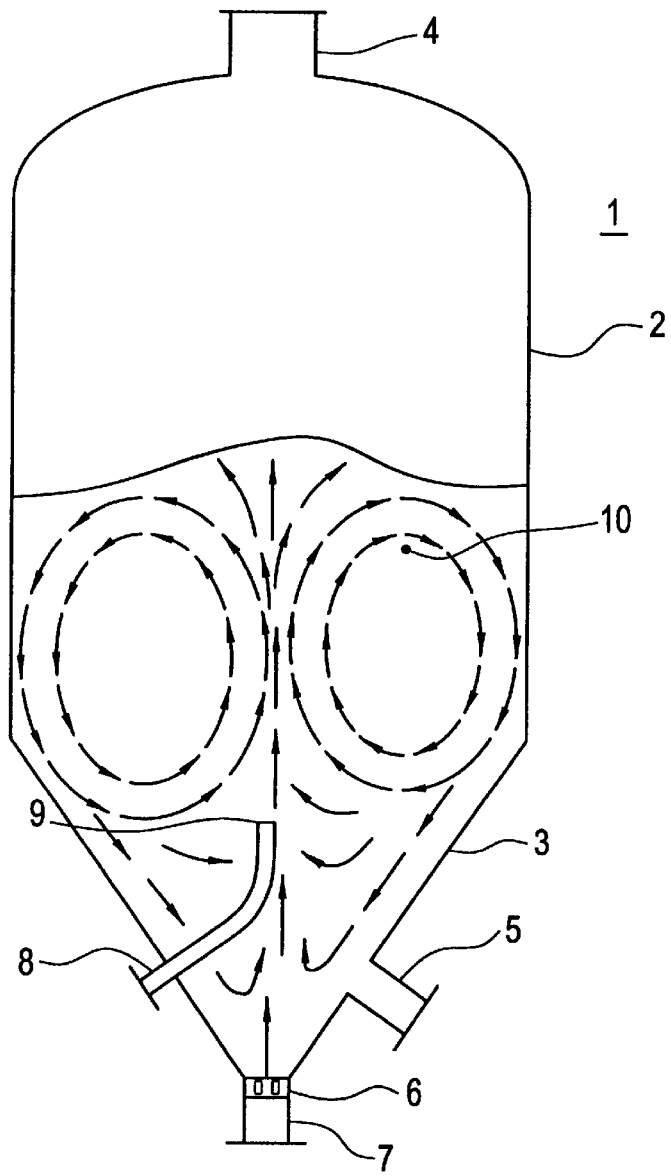
FIG. 1 shows a schematic diagram of a preferred ascending jet reactor, in longitudinal section.

Any chemical and physical materials conversion processes, in which performing intensive, thorough mixing of dissolved and/or suspended materials participating in a materials conversion process in a liquid medium is required, may be amenable to the process according to the invention, which may be performed batchwise or continuously. Physical materials conversion processes comprise in particular the conversion of a dissolved substance into a solid substance, thus crystallization processes, wherein the process according to the invention is particularly suitable for continuous crystallization. Chemical materials conversion processes may comprise, for example, the formation of a reaction product from two or more reactants or a polymerization process. In these types of processes a solid may be present suspended in the liquid medium, for example a suspension catalyst or a dissolving reactant, or insoluble reaction products may be formed in the liquid medium. One of the reaction partners may also be a gaseous substance supplied to the reactor. The process is particularly suitable for those reactions in which a solid, which may have a low or a high molecular weight, is formed or in which a suspended catalyst is continuously removed from the reactor and then returned after regeneration.

In carrying out one aspect of the invention, the process calls for reducing or avoiding foam production during chemical and physical materials conversion processes in a liquid medium, by performing the materials conversion in a hopper-shaped reaction zone with thorough mixing of the contents of the reaction zone.

The reaction zone is an ascending jet reaction zone which is substantially free of baffles, tapering in the lower section and provided with gas injection in a position which enables ascending jet circulation. The thorough mixing of the reaction contents is achieved by gas injection.

In further detail, the process of this invention is especially applicable for the materials conversion in a crystallization process, wherein a solution of the compound to be crystallized or solutions of raw materials for the in-situ formation of a solution of the compound to be crystallized is introduced continuously or periodically to the ascending jet reaction zone. In this embodiment the solutions are supersaturated or the supersaturation is produced by vaporization cooling, and a solids-rich suspension is withdrawn through a port located in the wall of the lower section of the reactor zone.

In the embodiment of the invention where the materials conversion is a catalytic reaction involving the formation of a polymer which is insoluble in the liquid medium, one or more monomers and catalyst are introduced to the ascending jet reactor zone and a suspension rich in insoluble polymer is withdrawn through a port located in the wall of the lower section of the reactor zone.

When carrying out a catalytic reaction in accordance with the invention wherein the materials conversion is a catalytic reaction in the presence of a suspension catalyst which has to be continuously regenerated, one or more of the solutions containing compounds to be reacted can be introduced to the ascending jet reactor zone continuously or periodically. A phase rich in suspension catalyst is then withdrawn through a port located in the walls of the lower section of the reactor zone and the catalyst is returned to the reactor zone after regeneration.

According to a specific embodiment of the invention the materials conversion can be the preparation of a hydrogen peroxide reaction product selected from the group consisting of sodium perborate, sodium percarbonate and form amidine sulphinic acid. In this aspect of the invention an aqueous hydrogen peroxide solution and a solution containing a substance selected from the group consisting of sodium metaborate, sodium carbonate and thiourea is introduced to the ascending jet reactor zone filled with a saturated solution of the $H_2O_2$ reaction product be prepared. The ratio of components is at least in accordance with the stoichiometric requirements. A solids-rich suspension is then withdrawn through a port located in the wall of the lower section of the reactor zone.

The liquid medium generally employed according to the invention is a solution in water, an aqueous/organic solvent or a purely organic solvent. Due to the gas injection procedure and thus the fact that the gas becomes loaded with solvent vapor, and optionally the requirement to recover this, sufficiently high-boiling organic solvent systems or such solvent-containing aqueous/organic systems or water are substantially used, wherein water is particularly preferred.

The materials conversion process may take place at any suitable temperature. Temperatures of about $-10°$ C. to $150°$ C. are generally preferred. If water is used as the solvent in the liquid medium, the temperature is expediently between the freezing point and $100°$ C. The pressure during materials conversion may also vary over wide limits, being below, at or above atmospheric pressure. When using a reactor designed as a vacuum container, materials conversions may be performed under reduced pressure, for instance under the conditions of vaporization cooling.

A device for performing the process according to the invention has also been found, this comprising an ascending jet reactor which consists of a container which tapers over the lower section with a device for gas injection in a position which enables ascending jet circulation, wherein the reactor contains a port in the tapering lower section for withdrawing a solids-rich suspension and, above the device for gas injection, an inlet pipe for introducing a liquid medium, wherein the discharge opening in the inlet pipe is located in the region of the stream of bubbles being produced when the container is in the operating state.

The reactor to be used is designed as an ascending jet reactor which enables extensive circulation of the contents of the reactor by means of point source or linear gas injection. In order to produce undisturbed extensive circulation, the reactor is substantially free of baffles such as guide plates, agitators and the like. Inside the reactor, however, one or more feed pipes, for supplying reactants, may be mounted. These types of feed pipes may terminate at any point in the reactor, but they preferably terminate in the region of the stream of bubbles being produced when the reactor is in the operating state, above the gas injection device or in the vicinity of the surface of the liquid, but within the liquid.

Circulation is encouraged by the tapering lower section and furthermore, in the case of suspensions, suspension cut-off is produced and classification of the solids particles takes place. The reactor preferably consists of a cylindrical upper section and a conically designed lower section, wherein the conical lower section, in accordance with a preferred embodiment of the process, has dimensions such that it accommodates at least half the volume of liquid to be circulated. The reactor may also be rectangular and have a cuboid upper section and a wedge-shaped, i.e. tapering to a point, lower section. The included angle of the cone or lower section tapering to a point is generally between 45° and 150°, in particular between 60° and 120°. A port is arranged in the conical or wedge-shaped lower section for withdrawing a solids-rich suspension.

Thus, with reference to the accompanying drawings, FIG. 1 shows an ascending jet reactor (1) which represents a preferred embodiment of a device for performing the process according to the invention. The container comprises a cylindrical upper section (2) and a conical lower section (3). The container lid contains a port (4) for extracting vapors and for connecting to a vacuum system (not shown). A port (5) is arranged in the wall of the cone, for withdrawing a suspension. The position of this port is expediently below that of the suspension cut-off established in the operating state. A device for gas injection (6), for example a perforated plate, is arranged at the tip of the cone. The gas is supplied through a port (7) and passes through the device for gas injection into the reactor. The reactor is substantially free of baffles. In the embodiment in accordance with FIG. 1, there is only one pipe (8) inside the reactor, this being used to introduce the liquid feedstock and having its discharge opening (9) located in the region of the stream of bubbles produced in the operating state. In the operating state, i.e. when gas is being forced in or, preferably, when gas is being abstracted under reduced pressure, an extensive circulation flow is produced in the solution or suspension (10) found in the reactor, the direction of flow being indicated by arrows.

Figure 2:
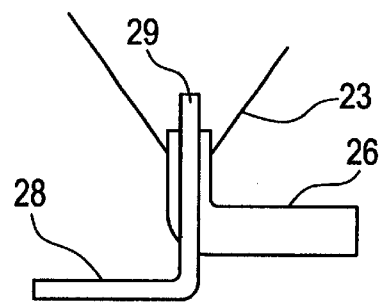
FIG. 2 shows a specific embodiment of the lower section of a reactor of this type, also in longitudinal section.

In the embodiment in FIG. 2, a tubular device (26) for gas injection is located at the tip of the conical lower section (23). The gas emerges from the annular gap formed by this device and an inlet pipe (28) which is located centrally within this. The discharge opening (29) of the inlet pipe can be altered by shifting the pipe (28) so that the position of the suspension cut-off, in processes in which suspended particles are involved, can be altered.

The process according to the invention is particularly suitable for processes during which a product is crystallized out of the liquid medium or during which particles which increase in size are produced in some other way, for example by polymerization. Examples of applications of the process are the preparation of active oxygen compounds, for instance $H_2O_2$ reaction products from the group consisting of sodium percarbonate, sodium perborate tetrahydrate, persulphates, also including the triple salt $2KHSO_5$ $KHSO_4$ $K_2SO_4$, form amidine sulphinic acid. During in-situ preparation and crystallization, both an aqueous $H_2O_2$ solution and also the other reaction partner required, that is soda, sodium metaborate, Caro's acid and KOH or thiourea respectively, each being in a dissolved form and separate from the $H_2O_2$ or already mixed with it, are added to the reactor filled with mother liquor. Suspension is simultaneously withdrawn. After separating the crystals from the suspension, one or more reaction partners is added to the mother liquor which is then recycled in this form. The process is also extremely suitable for crystallizing amino acids.

It is assumed that three hydraulically separated regions are formed in the ascending jet reactor, the effect of each on crystallization being interpreted as follows:

(i) Ascending region in the stream of bubbles: The reactants are introduced here, with the advantage that axial bundling of the lines of flow maintains supersaturation of the solution and the heat of reaction and of crystallization is rapidly dissipated by vacuum cooling at the surface. It has proven especially advantageous if the reactants are introduced at as low a level as possible, that is just above the suspension cut-off being formed, so that the supersaturated solution encounters a high suspension density of preferably coarser particles.

(ii) Descending region in the outer parts of the reactor: As a result of extensive circulation, transverse flow classification takes place. Fine particles are drawn into the upper region in the stream of bubbles, while particles which are increasing in size migrate, on increasingly longer paths, towards the tip of the tapering, preferably conical or wedge-shaped, lower section of the reactor.

(iii) Cut-off for the suspension density in the tapering (conical) lower section: The diminution in the ascending stream occurring towards the tip of the cone restricts the hydraulic transport of particles. Thus, a cut-off in suspension density is produced with increasing size and number of particles, at the same level as the hydraulic equilibrium. Thus, a highly concentrated, that is solids-rich, suspension can be withdrawn at the base of the container, without sedimentation occurring.

As is well-known, secondary crystal seed formation is one of the most important factors determining the particle size distribution of a crystallizate. Whereas, in the case of previously disclosed processes using crystallizers containing a variety of different shapes of baffles and agitators and/or pumps as circulation devices, improving poor particle number regulation has been attempted by using chemicals and/or complicated equipment, the process according to the invention demonstrates unexpected advantages during a crystallization process:

Simple reactor, substantially without any baffles;
Simple control of circulation;
No break-down of particles due to rotating units or deflections at sharp baffle edges;
Simple adjustment of residence time in order to produce a specific range of particle sizes;
Adjustable classification; No additional apparatus or process steps required to isolate and redissolve fine particles.

One particular, totally unexpected advantage of the process according to the invention is the modified foam producing behavior. Systems which generally have a strong tendency to foam can be handled in the process according to the invention without any antifoam additives and also mechanical devices for breaking down the foam are rendered superfluous. It is assumed that several effects contribute to this modified foam-producing behavior:

(i) Depending on the gas injection conditions (pressure, size of nozzles, temperature), it is quite possible to obtain large primary bubbles which burst during foam production. Gas injection is preferably performed using a nozzle with large nozzle openings (diameter in the 1 to 10 mm range) and under reduced pressure (suction).
(ii) Due to the presence of the stream of rising bubbles, a large additional surface area is produced for evaporation, no vapor bubbles being produced during this process. (iii) Boiling bubbles, which are produced on the particles, can diffuse during ascending jet circulation into the interior of the gas bubbles very deep down in the reactor and so no longer contribute, as large bubbles, to foam production, or do so to a much smaller extent. High shear forces occur in the stream of bubbles and these cause the loosening of tiny bubbles. (iv) The very large stream of liquid circulating in the reactor is diverted at the surface and moves suddenly from the core flow to the outer region of the reactor, so that mechanical foam break-down and/or inhibition of foam production takes place during the nascent phase.

The device according to the invention is distinguished by a particularly simple type of construction while at the same time providing high efficiency both with regard to reducing the tendency to form a foam or destroying foam and also with regard to classifying particles suspended in the liquid medium. In addition, virtually no incrustation problems arise, due to the absence of baffles, apart from one or more inlet pipes.

The following examples and comparison examples explain the invention.

COMPARISON EXAMPLE 1

Preparation of Sodium Percarbonate a) Batchwise Crystallization

The crystallization reactor, designed as a vacuum container, was made of glass and had a dished boiler head. Circulation was achieved using an agitator. The crystallization time was 60 min, the temperature was 15° C. and the pressure was 16 mbar abs.

A synthetic mother liquor comprising 45 kg of water, 10 kg of NaCl, 2.23 kg of soda, 1.18 l of $H_2O_2$ (70 wt.%), 10 g of NaHMP (sodium hexametaphosphate) and 50 ml of waterglass was initially introduced.

5.03 kg of soda and 30 g of NaHMP were added to the mother liquor (=made-up mother liquor). 2.92 l of an aqueous $H_2O_2$ solution (70 wt. %) were metered in.

Test 1: Using the synthetic mother liquor; the mother liquor with added soda was filtered before adding $H_2O_2$. After crystallization, sodium percarbonate was separated from the mother liquor and dried. Its active oxygen content (Oa) was 13.9%, the proportion of fines (<0.2 mm) was 2%.

Test 2: Using the filtered mother liquor from test 1; the made-up mother liquor was filtered. The analytical data showed: Oa=14.4%, fines (<0.2 mm)=14%.

Test 3: Using the synthetic mother liquor; the madeup mother liquor, in contrast to test 1, was not filtered. The analytical data showed: Oa=14.4%, fines (<0.2 mm) 14%.

Test 4: Using a non-filtered mother liquor from test 3, made-up mother liquor not filtered. The analytical data showed: Oa=14.4%, fines (<0.2 mm)=24%.

In tests 1 to 4, in the absence of an antifoam agent, a deep layer of foam was produced. In addition, the proportion of fines was always very high.

b) Continuous Crystallization

The crystallization reactor was the same as that in tests 1 to 4, but it was provided with devices for the continuous addition of made-up mother liquor and $H_2O_2$ solution and also for continuous removal of the suspension. A synthetic mother liquor with the same composition and in the same amount as in comparison example 1 was initially introduced. After making up this solution with 5.03 kg of soda and 30 g of NaHMP, aqueous 70 wt. % strength $H_2O_2$ solution (molar ratio soda to $H_2O_2$=1:1.5) was metered in at 15° C., at a pressure of 16 mbar abs, over the course of 1 hour and with stirring.

Test 5: Sodium percarbonate which had crystallized out was removed from the suspension discharged during crystallization; the mother liquor obtained in this way was made up, while retaining the ratio of mother liquor to soda and NaHMP, and filtered before being returned to the crystallizer. The Oa content of the sodium percarbonate was 14.4%, the fines (<0.2 mm) amounted to 9%.

Test 6: if the made-up mother liquor was returned to the crystallizer without being filtered, the fines increased to 20 to 40%.

Intense foam production took place during continuous crystallization and an antifoam agent had to be added in order to maintain the vacuum required. Tri-n-butyl phosphate proved to be the best antifoam agent, this being added in an amount of 0.2 ml per liter of suspension in tests 5 and 6.

Example 1

Preparation of Sodium Percarbonate

Continuous crystallization in vacuum in a crystallizer made of glass with a cone in the lower section of the crystallizer. Circulation was achieved using air injection. The air was introduced at the tip of the cone. In the lower part of the wall of the cone was a port for the withdrawal of suspension. Aqueous $H_2O_2$ solution (60 wt. % strength) and mother liquor made-up with soda and NaHMP were metered in continuously with the molar ratio $H_2O_2$ to soda of 1.5. The inlet pipes terminated below the surface of the liquid. Injection air: 365 Nl/h; average residence time about 1 h, temperature 25° C., pressure 44 mbar abs., metering of made-up mother liquor: 14.7 kg/h (composition: 9.94 kg of water, 2.3 kg of NaCl, 2.38 kg of soda, 14.9 g of NaHMP, 40 ml of water glass).

Test 1: The mother liquor was made-up after filtration (Nutsche) and metered into the crystallizer without being filtered. After recycling the entire amount of mother liquor five times, the materials data for the sodium percarbonate was: Oa=14.36%, fines (<0.2 mm)=1.9%, $Dp_{50}$=1.35 mm.

Test 2: The mother liquor was made up without being filtered and metered into the crystallizer without being filtered. After recycling the mother liquor five times the materials data for the sodium percarbonate was: Oa=14.25%, fines (<0.2 mm)=0.6%, $Dp_{50}$=1.23 mm.

No foam problems occurred during continuous crystallization trials in accordance with the principle according to the invention. An approximately 10 cm deep layer of foam remained stable during the tests. An antifoam agent was not added. The product is characterized by a low proportion of fines.

Example 2

Preparation of Formamidine Sulphinic Acid (FSA)

Continuous crystallization under vacuum in a crystallizer made of glass with a conically shaped lower section to the crystallizer. Circulation was achieved using air injection—introduced from below at the tip of the cone. Inlet pipes and withdrawal ports in accordance with example 1. Injection air: 40 Nl/h, residence time about 2.5 h, temperature 6.5° C., pressure 10 mbar abs.

Saturated FSA solution at 20° C. was initially introduced; thiourea solution (35 wt. %, 55° C.) was metered into the crystallizer; an aqueous $H_2O_2$ solution (35 wt. %) was also metered in, such that the molar ratio of $H_2O_2$ to thiourea was 2.01.

The FSA isolated from the withdrawn suspension had the following materials characteristics: $Dp_{50}$=0.23 mm, FSA content=98.7%, TU content=<0.1%.

The amount of foam remained constant during continuous crystallization and the amount did not increase as compared with the small amount of foam produced at the start.

Example 3

Crystallization of Thiourea (TU)

Continuous crystallization under vacuum in a crystallizer made of glass with a cone in the lower section of the crystallizer (crystallizer in accordance with examples 1 and 2). The inlet pipe for TU solution terminated below the surface of the liquid in the region of the gentle stream of bubbles. A port for withdrawing solids-rich suspension was located in the lower part of the wall of the cone. Circulation was achieved by air injection in an amount of 60 Nl/h. Residence time about 1.8 hours, temperature 26.5° C., pressure 40 mbar abs. Initial feedstock: saturated TU solution at 20° C., about 12 kg; thiourea solution (35 wt. %, 70° C.) was metered into the crystallizer, unfiltered, in an amount of 7.5 kg/h.

Thiourea with an average particle size of $Dp_{50}=0.43$ mm was obtained. Differently from conventional crystallization, surprisingly, there was no foam production and nor were incrustations produced on the wall of the crystallizer.

Further variations and modifications of the foregoing will be apparent to those skilled in the art and are intended to be encompassed by the claims appended hereto.

German priority application 196 50 959.9 is relied on and incorporated herein by reference.

We claim:

1. An ascending jet reactor comprising:
   a container for a liquid medium, and
   a device for gas injection in a lower, tapering section of said container in a position which enables ascending jet circulation and introduces a stream of bubbles into said container,
   wherein said reactor contains
      a port for withdrawal of a solids-rich suspension in the lower, tapering section and
      at least one inlet pipe with a discharge opening for introducing a liquid medium into the container above the device for gas injection and extending into the container,
      wherein the opening of the device for gas injection is positioned at the bottom of the lower tapering section of the container,
      wherein the discharge opening of the inlet pipe is located inside the region of said stream of bubbles produced while the reactor is under operation, and
      wherein the container of the reactor is substantially free of baffles.

2. An ascending jet reactor according to claim 1, further comprising a port for connecting to a vacuum system.

3. An ascending jet reactor according to claim 1, wherein the container for the liquid medium comprises a cylindrical upper section.

4. An ascending jet reactor comprising:
   a container for a liquid medium, with a lower tapering sections substantially free of baffles,
   a device for gas injection in said lower tapering section which enables ascending jet circulation in the container, wherein the opening of the device for gas injection is positioned at the bottom of the lower tapering section of the container,
   a port in the lower tapering section for withdrawal of a solids-rich suspension, at least one inlet pipe with a discharge opening for introducing said liquid medium into the container, above the device for gas injection, and extending into the container, wherein the discharge opening of the inlet pipe is located inside the region of a stream of bubbles produced while the reactor is under operation, and
   a port for connecting to a vacuum system.

5. An ascending jet reactor according to claim 4, wherein the container for the liquid medium comprises a cylindrical upper section.

* * * * *